(12) United States Patent
Glozman et al.

(10) Patent No.: US 12,725,232 B2
(45) Date of Patent: Sep. 1, 2026

(54) REMOVAL OF BACKGROUND NOISE FROM IMAGE

(71) Applicant: Novocure GmbH, Root (CH)

(72) Inventors: Yana Glozman, Haifa (IL); Reuven Ruby Shamir, Haifa (IL); Yissachar Abraham, Haifa (IL)

(73) Assignee: Novocure GmbH, Baar (CH)

( * ) Notice: Subject to any disclaimer, the term of this patent is extended or adjusted under 35 U.S.C. 154(b) by 169 days.

(21) Appl. No.: 18/373,735

(22) Filed: Sep. 27, 2023

(65) Prior Publication Data

US 2024/0112313 A1 Apr. 4, 2024

Related U.S. Application Data

(60) Provisional application No. 63/411,485, filed on Sep. 29, 2022.

(51) Int. Cl.

*G06T 5/75* (2024.01)
*G06T 5/70* (2024.01)
*G06T 7/194* (2017.01)

(52) U.S. Cl.

CPC .................. *G06T 5/75* (2024.01); *G06T 5/70* (2024.01); *G06T 7/194* (2017.01); *G06T 2207/30004* (2013.01)

(58) Field of Classification Search

None

See application file for complete search history.

(56) References Cited

U.S. PATENT DOCUMENTS 6,058,218 A * 5/2000 Cline ........................ G06T 5/30 382/128
7,565,205 B2 7/2009 Palti
7,574,031 B2 8/2009 Dehmeshki
7,876,947 B2 1/2011 Lee et al.
8,165,385 B2 4/2012 Reeves et al.
9,418,420 B2 8/2016 Brown
9,721,341 B2 8/2017 Kang et al.

(Continued)

FOREIGN PATENT DOCUMENTS

WO 2011139232 A1 11/2011

OTHER PUBLICATIONS

Wang, et al., "Fully Automatic Intervertebral Disc Segmentation Using Multimodal 3D U-Net," 10 pages.

*Primary Examiner* — David Ometz

(74) *Attorney, Agent, or Firm* — McCarter & English, LLP; Michael A. Sartori

(57) ABSTRACT

A computer-implemented method to background noise from a medical image comprising voxels, each voxel having a voxel intensity, the method comprising: generating a mask based on the medical image, wherein the mask comprises a foreground portion designating foreground voxels, a background portion designating background voxels, and a perimeter separating the foreground portion from the background portion; designating a perimeter portion of the mask, the perimeter portion enclosing the perimeter, a subset of the foreground portion, and a subset of the background portion; designating a threshold for the perimeter portion to separate voxels based on voxel intensity; filtering the medical image with the mask and the threshold to obtain a filtered image; and displaying the filtered image on a display.

20 Claims, 7 Drawing Sheets

(56) References Cited

U.S. PATENT DOCUMENTS

| | | | | |
|---|---|---|---|---|
| 9,741,123 | B2 | 8/2017 | Nakano | |
| 9,741,125 | B2 * | 8/2017 | Baruch | G06T 7/187 |
| 10,147,185 | B2 | 12/2018 | Riklin Raviv et al. | |
| 10,388,020 | B2 | 8/2019 | Guo et al. | |
| 10,402,976 | B2 | 9/2019 | Dutta et al. | |
| 10,679,740 | B2 | 6/2020 | Chen et al. | |
| 11,100,611 | B2 | 8/2021 | S et al. | |
| 11,416,999 | B2 | 8/2022 | Goris et al. | |
| 2005/0213845 | A1 * | 9/2005 | Avinash | G06T 7/194 382/173 |
| 2007/0092864 | A1 | 4/2007 | Reinhardt et al. | |
| 2009/0097728 | A1 * | 4/2009 | Lee | G06T 7/155 382/131 |
| 2009/0129671 | A1 | 5/2009 | Hu et al. | |
| 2015/0078640 | A1 * | 3/2015 | Guo | G06T 7/12 382/131 |
| 2020/0311877 | A1 * | 10/2020 | S | G06T 7/11 |
| 2022/0096853 | A1 * | 3/2022 | Bakalo | G16H 50/50 |
| 2022/0230310 | A1 | 7/2022 | Xie et al. | |

* cited by examiner

REMOVAL OF BACKGROUND NOISE FROM IMAGE

CROSS-REFERENCE TO RELATED APPLICATIONS

This application claims priority to U.S. Provisional Application No. 63/411,485, filed Sep. 29, 2022, the contents of which are incorporated by reference herein in their entirety.

BACKGROUND

Tumor treating fields (TTFields) are low intensity alternating electric fields within the intermediate frequency range (for example, 50 kHz to 1 MHz), which may be used to treat tumors as described in U.S. Pat. No. 7,565,205. TTFields are induced non-invasively into a region of interest by transducers placed directly on the subject's body and applying alternating current (AC) voltages between the transducers. Conventionally, a first pair of transducers and a second pair of transducers are placed on the subject's body. AC voltage is applied between the first pair of transducers for a first interval of time to generate an electric field with field lines generally running in the front-back direction. Then, AC voltage is applied at the same frequency between the second pair of transducers for a second interval of time to generate an electric field with field lines generally running in the right-left direction. The system then repeats this two-step sequence throughout the treatment.

TTFields treatment planning can include the segmentation of tissues from background voxels on medical images (e.g., magnetic resonance imaging (MRI) images) for determining locations to place the transducers on the subject's body and evaluating the distribution of TTFields and the quantitative treatment efficacy. Manual segmentation is time-consuming, and conventional computer-implemented segmentation can lack accuracy. Furthermore, with conventional approaches, large amounts of data and the data annotations can result in noisy labeling and intra- and inter-observer variability.

BRIEF DESCRIPTION OF THE DRAWINGS

Various embodiments are described in detail below with reference to the accompanying drawings, wherein like reference numerals represent like elements.

DESCRIPTION OF EMBODIMENTS

To provide a subject with an effective TTFields treatment, precise locations at which to place the transducers on the subject's body must be generated, and these precise locations are based on, for example, the type of the cancer, the size of the cancer, and the location of the cancer in the subject's body. However, determining these precise locations is challenging, and this determination is typically done by computer simulations of numerous possible locations to place the transducers.

Such computer simulations are built from images (e.g., magnetic resonance imaging (MRI), computerized tomography (CT), etc.) used to model the subject. To perform the simulations, a computer needs to perform image segmentation to identify target tissue from background noise and to remove the background noise. One difficulty in such image segmentation is how to accurately separate foreground voxels (e.g., voxels of the target tissue) from background voxels (e.g., noise and/or artifacts). Another difficulty is how to account for user input to improve the accuracy and personalization of the segmentation for a subject. For example, identifying the boundary of the target tissue (e.g., skin) from surrounding background voxels may be difficult because the size, texture, and shape of the target tissue may vary from subject to subject.

The inventors recognized these problems and discovered an approach to remove background from a medical image by generating a mask based on the medical image and filtering the medical image with the mask and the threshold to remove background from the medical image. By setting a user-adjustable perimeter of the mask and a user-adjustable threshold, the accuracy and efficiency of background removal may be improved and thus the accuracy and efficiency of tumor treatment planning may be improved.

Figure 1:
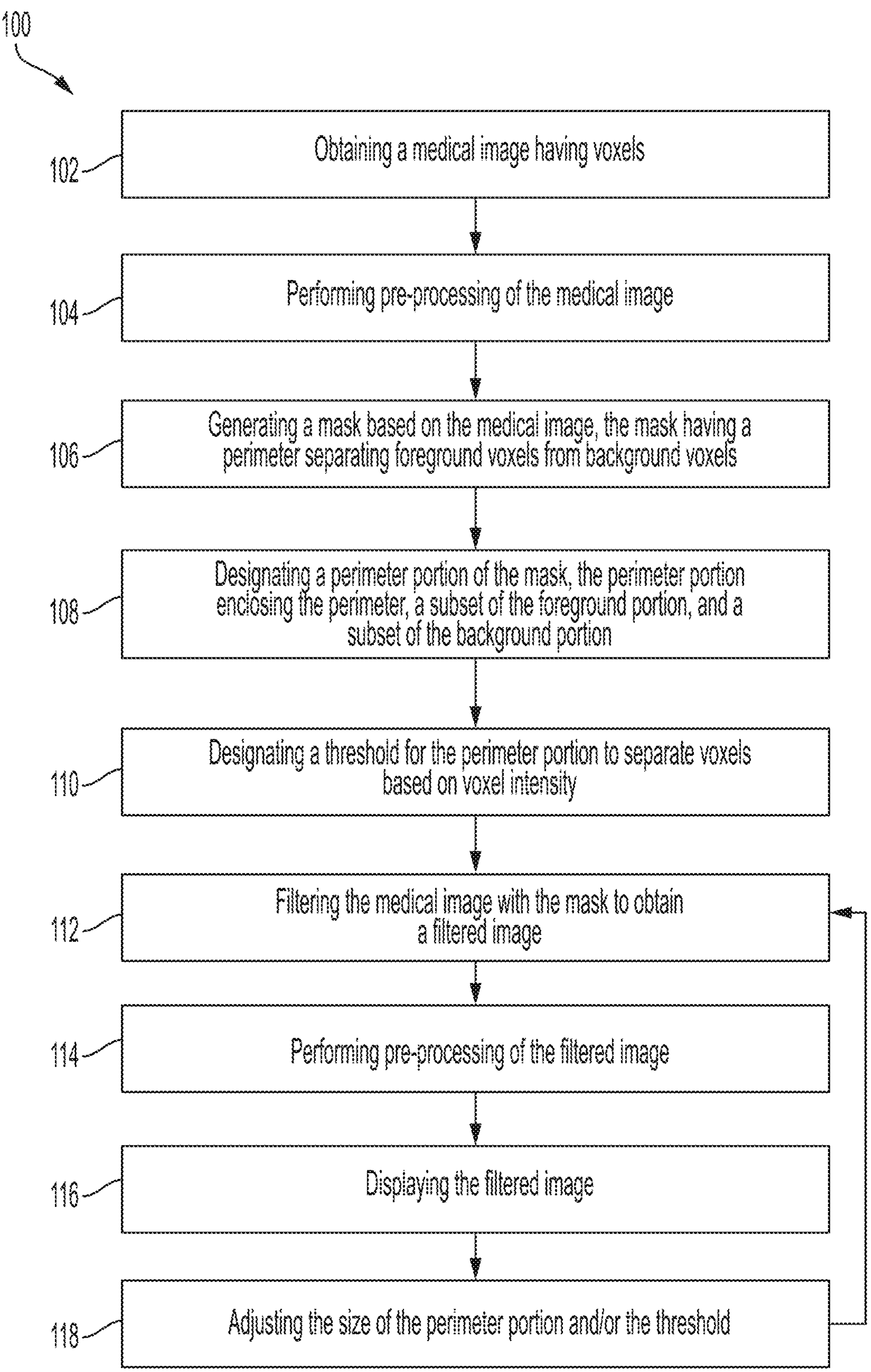
FIG. 1 is a flowchart depicting an example of removing background from a medical image.

FIG. 1 is a flowchart describing an example of a computer-implemented method 100 for removing background from a medical image. In some embodiments, the image is not limited to medical image and may be any kind of image. Certain steps of the method 100 are described as computer-implemented steps. The computer may be any device including one or more processors and memory accessible by the one or more processors, the memory storing instructions that when executed by the one or more processors cause the computer to perform the relevant steps of the method 100. While an order of operations is indicated in FIG. 1 for illustrative purposes, the timing and ordering of such operations may vary where appropriate without negating the purpose and advantages of the examples set forth in detail throughout this disclosure.

With reference to FIG. 1, at step 102, the method may include obtaining a medical image having voxels. The medical image may, for example, include at least one of a magnetic resonance imaging (MRI) image, a computerized tomography (CT) image, an X-ray image, an ultrasound image, nuclear medicine image, positron-emission tomography (PET) image, arthrogram images, myelogram images, or any image of the subject's body providing an internal view of the subject's body. Each image may include an outer shape of a portion of the subject's body and a region corresponding to a region of interest (e.g., tumor) within the subject's body. In one example, the medical image may be a three-dimensional (3D) MRI image.

At step 104, the method 100 may include performing one or more pre-processing procedures on the medical image. In some embodiments, the pre-processing procedure may include at least one of Gaussian smoothing or bias correction. In one example, the bias correction is N4 bias correction. In some embodiments, the pre-processing procedure produces a more smoothed and bias-free image. In some embodiments, the pre-processing procedure may include scaling the voxel intensities of the voxels in the medical image to obtain scaled medical images. In one example, the following steps 106 to 118 are performed on the scaled medical images.

At step 106, the method 100 may include generating a mask based on the medical image. In some embodiments, the mask includes a foreground portion designating foreground voxels, a background portion designating background voxels, and a perimeter separating the foreground portion from the background portion. In some embodiments, the mask is generated through at least one of a multi Otsu thresholding operation, a k-means clustering operation, or a morphological segmentation operation.

In some embodiments, the foreground portion having foreground voxels represents desired tissue (e.g., target tissue) in the medical image, and the background portion having background voxels represents one or more regions in the medical image without desired tissue. In some embodiments, the foreground portion represents a region of interest in the medical image, and the background portion represents one or more regions in the medical image not in the region of interest. In one example, the desired tissue is at least one of skin, bone, skull, organ, brain, or any tissue in a human body. In a more specific example, the foreground portion corresponds to a subject's head. As another example, the foreground portion corresponds to a subject's torso.

Figures 4A, 4B, 4C, 5A, 5B, 5C, 6A, 6B, 6C, 7A, 7B, 7C:
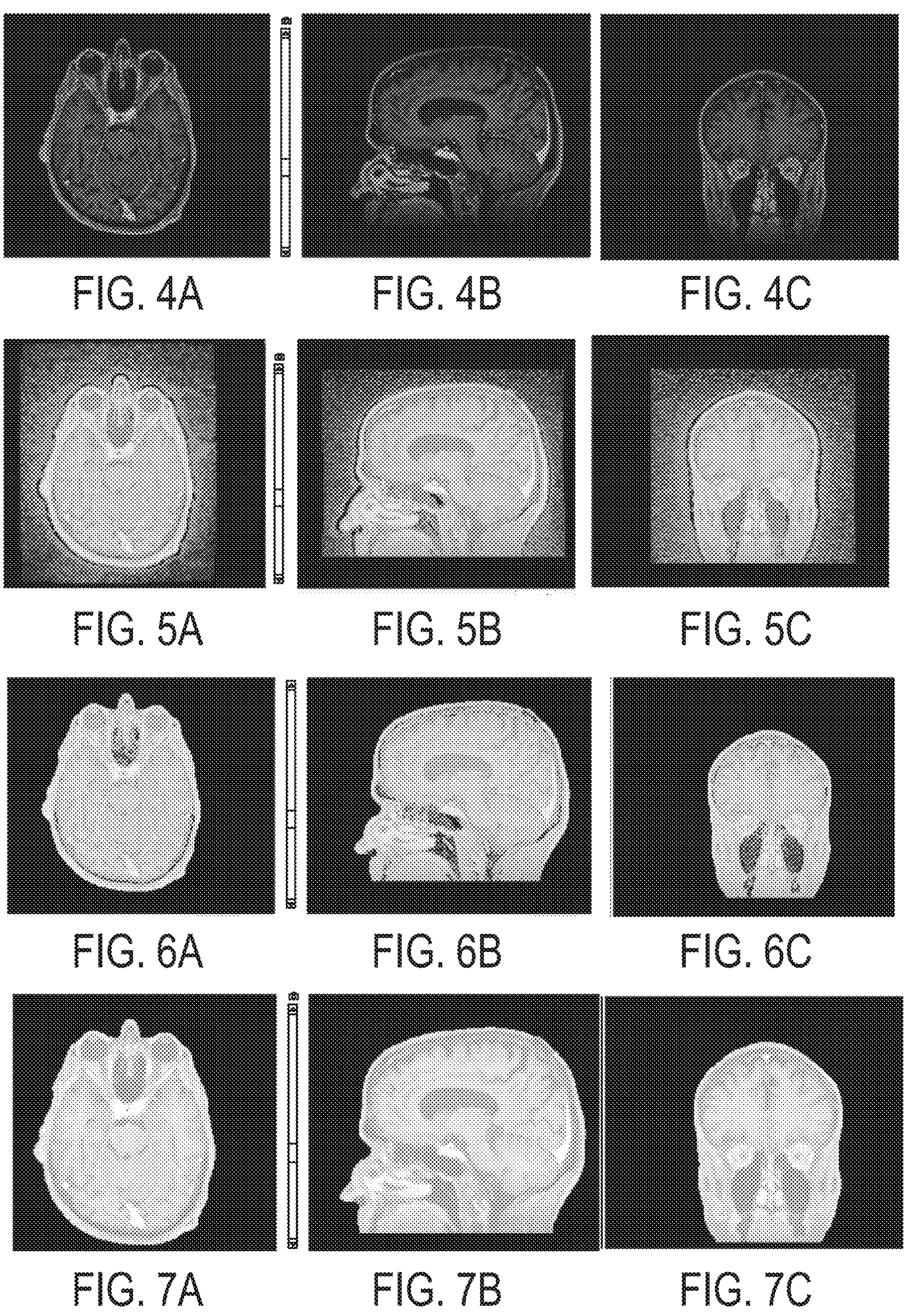
FIGS. 4A-4C depict examples of medical images.
FIGS. 5A-5C depict examples of the medical images with histogram adjustment showing existing background noises.
FIGS. 6A-6C depict examples of filtered medical images.
FIGS. 7A-7C depict examples of filtered medical images.

At step 108, the method 100 may include designating a perimeter portion of the mask, the perimeter portion enclosing the perimeter, a subset of the foreground portion, and a subset of the background portion. In some embodiments, the perimeter portion includes a foreground perimeter separating the perimeter portion from a remainder of the foreground portion and the remainder of the foreground portion not including the subset of the foreground portion. In some embodiments, the perimeter portion further includes a background perimeter separating the perimeter portion from a remainder of the background portion and the remainder of the background portion not including the subset of the background portion. In some embodiments, the perimeter is approximately equidistant from the foreground perimeter and the background perimeter. In some embodiments, the width of the perimeter portion between the foreground perimeter and the background perimeter is approximately 5 mm, 10 mm, 15 mm, 20 mm, or 25 mm. The width of the perimeter portion between the foreground perimeter and the background perimeter may be dependent on the subject and/or imaging parameters. Examples of designating a perimeter portion of the mask are illustrated in FIGS. 4A-4C.

At step 110, the method 100 may include designating a threshold for the perimeter portion to separate voxels based on voxel intensity. In some embodiments, the threshold is a weighted threshold. In some embodiments, the threshold is user-defined. As an example, the threshold may be a user-defined weighted threshold.

Figure 2:
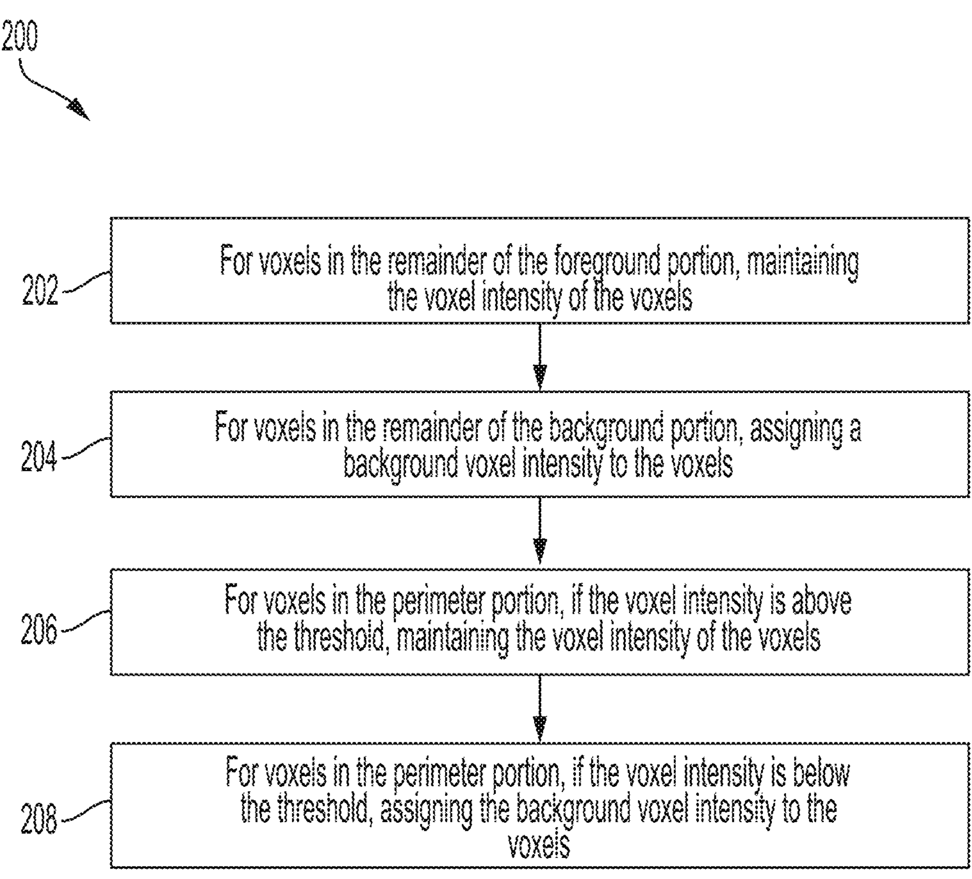
FIG. 2 is a flowchart depicting an example of filtering a medical image with a mask.

At step 112, the method 100 may include filtering the medical image with the mask to obtain a filtered image. In some embodiments, filtering the medical image is based on voxel intensity. For example, for voxels in the medical image located in a remainder of the foreground portion of the mask, their voxel intensity is maintained in the filtered image. For voxels in the medical image located in a remainder of the background portion of the mask, a background voxel intensity is assigned. In some embodiments, for voxels in the medical image located in the perimeter portion of the mask, a voxel intensity is assigned in the filtered image based on the threshold and a location of the voxel in the perimeter portion. For example, if the voxel intensity for a particular voxel is above the threshold designated at step 110, the voxel intensity for the particular voxel is maintained in the filtered image; and if the voxel intensity for a particular voxel is below the threshold, the voxel intensity for the particular voxel is assigned the background voxel intensity. Examples of filtering the medical image with the mask are illustrated in FIG. 2, which is discussed further below.

In some embodiments, for voxels in the medical image located in the perimeter portion, filtering the medical image may be based on voxel intensity and a distance of the voxel from the perimeter portion. In an example, filtering of the medical image may include averaging a voxel intensity of the voxel and an intensity assigned to the voxel based on a distance of the voxel from the perimeter portion. In an example, filtering of the medical image may include assigning an intensity to the voxel based on a distance relative to a location in the foreground portion. In other words, the voxel intensities for corresponding locations in the perimeter portion may be based on a distance of the locations from the foreground perimeter of the perimeter portion or the background perimeter of the perimeter portion. In some embodiments, the intensity assigned to the voxel is related to a distance between the voxel and a location in the foreground portion. In some embodiments, the intensity assigned to the voxel is proportional to a distance between the voxel and a location in the foreground portion. In some embodiments, the intensity assigned to the voxel is proportionate to a distance between the voxel and the perimeter of the perimeter portion. In some embodiments, the intensity assigned to the voxel is proportional to a distance between the voxel and a location on the foreground perimeter of the perimeter portion. As an example, the intensity assigned to the voxel is greater if the distance relative to the location in the foreground portion is smaller. As an example, the intensity assigned to the voxel may be the average of the intensity of the voxel and the intensity assigned to the voxel based on the distance of the voxel relative to a location in the foreground portion, and this assigned intensity may be expressed by the following equation:

$$p_{level}=(m_1+m_2)/2 \qquad \text{Equation (1)}$$

where $p_{level}$ is the voxel intensity assigned to the voxel, $m_1$ is the voxel intensity of the voxel in the medical image, and $m_2$ is the intensity assigned to the voxel as being proportional to a distance between the voxel and a location in the foreground portion.

In some embodiments, for a voxel in the medical image located in the perimeter portion, filtering of the medical image includes weighted averaging a voxel intensity of the voxel and an intensity assigned to the voxel based on a distance of the voxel from the perimeter portion. In other words, voxels in the medical image located in the perimeter portion of the mask are assigned a voxel intensity in the filtered image based on a weighted combination of a voxel intensity of the voxel in the medical image and another voxel intensity based on a location of the voxel in the perimeter portion. In some embodiments, for voxels in the medical image located in the perimeter portion, filtering of the medical image comprises voxel-by-voxel weighted summing of normalized voxel intensities of the voxels in medical image and voxel intensities for corresponding locations in the perimeter portion of the mask. As an example, the filtered image is generated based on the following equation:

$$p_{level}=w_1*m_1+w_2*m_2, w_2=1-w_1 \quad \text{Equation (2)}$$

wherein $m_1$ are voxel intensities of the voxels in the medical image, $m_2$ are voxels intensities for corresponding locations in the perimeter portion of the mask, and $w_1$ and $W_2$ are weighting parameters.

In some embodiments, the threshold designated at step 110 is a weighted threshold. As an example, for a voxel in the medical image located in the perimeter portion having an intensity greater than the weighted threshold, filtering of the medical image comprises assigning an intensity to the voxel based on an intensity of the voxel in the medical image or pre-processed medical image. As an example, for a voxel in the medical image located in the perimeter portion having an intensity greater than the weighted threshold, filtering of the medical image comprises assigning an intensity to the voxel based on a weighted average of intensities. In some embodiments, the threshold is a use-defined weighted threshold. In one example, the method 100 may include filtering the medical image with the mask and the user-defined weighted threshold to obtain the filtered image.

At step 114, the method 100 may include performing one or more post-processing procedures on the filtered image. In some embodiments, the post-processing procedure includes at least one of a morphologic closing operation, a three-dimensional (3D) fill-hole operation, or a smoothing operation. Step 114 may optionally be performed.

At step 116, the method 100 may include displaying the filtered image. As an example, the filtered image generated at step 112 is displayed. As an example, the filtered image generated at step 114 is displayed. In some embodiments, the method further includes displaying the voxel intensity of the medical image and/or displaying a weighted average voxel intensity of the voxel based on the distance of the voxel from the perimeter portion.

At step 118, the method 100 may include adjusting the size of the perimeter portion and/or threshold. In some embodiments, the method includes receiving user input to adjust filtering parameters to obtain adjusted filtering parameters, where the adjusted filtering parameters include at least one of an adjusted size of the perimeter portion or an adjusted threshold for the perimeter. As an example, the method includes adjusting the size of the perimeter portion to obtain a revised mask. As an example, the method includes adjusting the threshold to obtain a revised threshold. As an example, the threshold is a weighted threshold. As discussed above at step 112, for voxels in the medical image located in the perimeter portion of the mask, a voxel intensity is assigned in the filtered image based on the threshold and a location of the voxel in the perimeter portion. For example, if the voxel intensity is above the threshold, the voxel intensity is maintained in the filtered image; and if the voxel intensity is below the threshold, the assigned voxel intensity is the background voxel intensity. As such, a user can adjust the threshold to adjust the perimeter (e.g., skin boundary) in the filtered image. As an example, the user may be able to see the revised filtered image in real-time as the user adjusts the threshold. As an example, the method may include adjusting the size of the perimeter portion to obtain a revised mask and adjusting the threshold to obtain a revised threshold.

In some embodiments, one or more users (e.g., physicians, nurses, assistants, staff members, physicists, dosimetrists, etc.) may use a user interface to adjust the perimeter portion of the mask and/or the threshold using a user-adjustable level. In some embodiments, the user-adjustable level is an interactive slider in a user interface, and the interactive slider defines a removal area in proximity to the outer surface (e.g., perimeter) of tissue in the medical image. As an example, the interactive slider has user-adjustable discrete levels.

In some embodiments, the interactive slider (or other user interface) may be user-adjustable so as to adjust the discrete levels and/or to select a level of the perimeter portion within the predetermined discrete level range. In some embodiments, the user-adjustable discrete level has an initial setting. As an example, the user-adjustable discrete level may be user-adjustable from the initial setting to increase a size of the perimeter portion and is user-adjustable from the initial setting to decrease the size of the perimeter portion. As an example, the initial setting is the perimeter of the mask separating foreground voxels from background voxels. As an example, the user-adjustable discrete levels have between approximately 8 and approximately 512 discrete levels, where the initial setting of the user-adjustable level is approximately a middle of the discrete levels (e.g., the perimeter of the mask). As an example, the user-adjustable discrete levels have 255 discrete levels, and the initial setting of the user-adjustable level is at 126. In this example, the value 126 defines the perimeter of the mask separating foreground voxels from background voxels. An example of the user-adjustable discrete levels is illustrated in FIG. 3D, which is discussed further below. Examples of these embodiments regarding user-defined perimeter portion are illustrated in FIG. 12, which is discussed further below.

After the filtering parameters have been adjusted, flow of method 100 proceeds to step 112, and the loop is repeated. In some embodiments, the method further includes filtering the medical image with the revised mask and/or the revised threshold to obtain a revised filtered image and displaying the revised filtered image on the display.

In some embodiments, the method 100 further includes generating and outputting, based on the filtered image, one or more recommendations of locations on the subject's body to place one or more transducers for applying tumor treating fields to the subject's body. In some embodiments, the selection of locations to place one or more transducers may be further based on, for example, the region of interest of the subject's body corresponding to the tumor.

FIG. 2 is a flowchart depicting an example of filtering a medical image with a mask. Certain steps of the method 200 are described as computer-implemented steps. The computer may be any device including one or more processors and memory accessible by the one or more processors, the memory storing instructions that when executed by the one or more processors cause the computer to perform the relevant steps of the method 200. While an order of operations is indicated in FIG. 2 for illustrative purposes, the timing and ordering of such operations may vary where appropriate without negating the purpose and advantages of the examples set forth in detail throughout this disclosure.

At step 202, for voxels in the remainder of the foreground portion, filtering the medical image includes maintaining the voxel intensity of the voxels. At step 204, for voxels in the remainder of the background portion, filtering the medical image includes assigning a background voxel intensity to the voxels.

For voxels in the perimeter portion, if the voxel intensity is above the threshold, at step 206, the voxel intensity of the voxels is maintained; and if the voxel intensity is below the threshold, at step 208, a background voxel intensity is assigned to the voxels. In one example, the threshold is a weighted threshold.

In some embodiments, when the voxel intensity is above the threshold as in step 206, the voxel intensity is set to be the same as the voxel intensity in the medical image. In other words, when the voxel intensity is above the threshold, the voxel intensity of the medical image is maintained. In some embodiments, when the voxel intensity is above the threshold, the voxel intensity is set to be the voxel intensity of image after a post-processing procedure. In some embodiments, when the voxel intensity is above the threshold, the voxel intensity is set to be the average of the intensity of the voxel in the medical image and the intensity based on the distance of the voxel from the perimeter portion calculated by equation (1) above. In some embodiments, when the voxel intensity is above the threshold, the voxel intensity is set to be the weighted average of the intensity of the voxel in the medical image and the intensity based on the distance of the voxel from the perimeter portion calculated by equation (2) above.

Figure 3A:
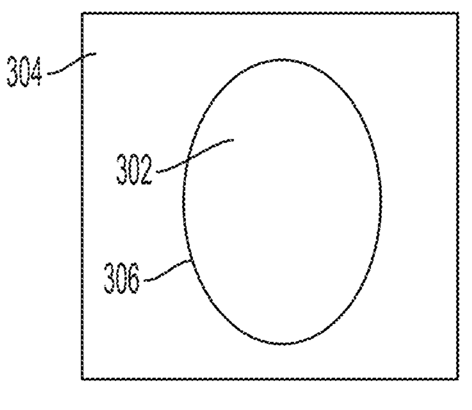
FIGS. 3A-3D depict examples of defining a perimeter portion.
Figure 3B:
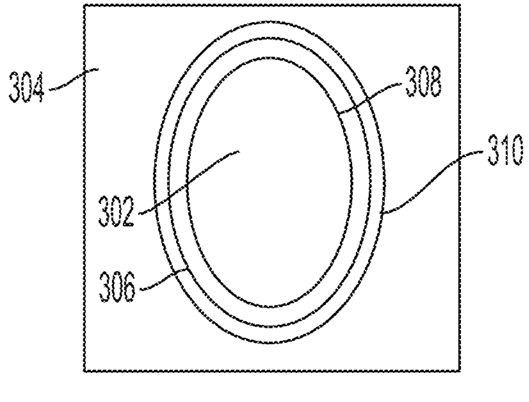
Figure 3C:
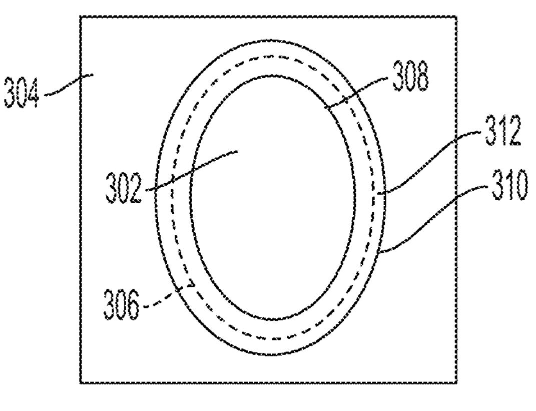
Figure 3D:
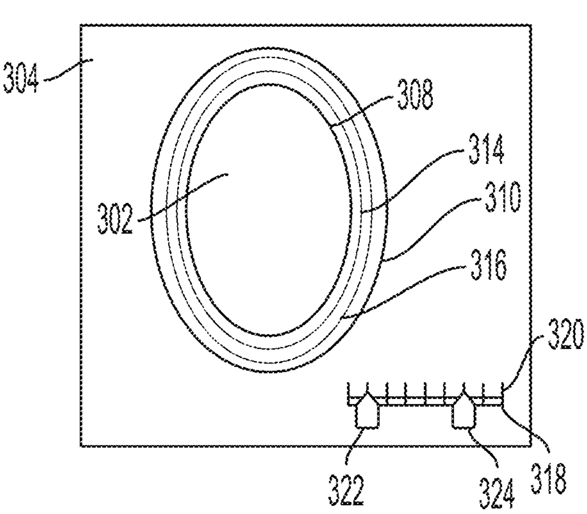

FIGS. 3A-3D depict examples of defining a perimeter portion. FIG. 3A depicts a mask image that is generated based on a medical image or pre-processed medical image. In this example, the mask comprises a foreground portion 302 designating foreground voxels, a background portion 304 designating background voxels, and a perimeter 306 separating the foreground portion from the background portion. The foreground portion 302 having foreground voxels represent desired tissue in a medical image, and the background portion 304 having background voxels represent one or more regions in the medical image without desired tissue. In the example depicted in FIG. 3A, the foreground portion 302 represents a subject's head.

FIGS. 3B and 3C depict an example of designating a perimeter portion 312 of the mask. The perimeter portion 312 encloses the perimeter 306, a subset of the foreground portion (e.g., a portion between a foreground perimeter 308 and the perimeter 306), and a subset of the background portion (e.g., portion between a background perimeter 310 and the perimeter 306). The perimeter portion 312 includes the foreground perimeter 308 separating the perimeter portion 312 from a remainder of the foreground portion, where the remainder of the foreground portion does not include the subset of the foreground portion. Furthermore, the perimeter portion 312 further includes the background perimeter 310 separating the perimeter portion 312 from a remainder of the background portion, where the remainder of the background portion does not include the subset of the background portion. As an example, the perimeter 306 is approximately equidistant from the foreground perimeter 308 and the background perimeter 310. As an example, the width of the perimeter portion 312 between the foreground perimeter 308 and the background perimeter 310 is approximately 5 mm, 10 mm, 15 mm, 20 mm, or 25 mm. In some embodiments, the perimeter portion of the mask is user-defined. As an example, a user interface with an interactive slider may be provided to designate the perimeter portion.

FIG. 3D depicts an example of adjusting the perimeter portion using a user-interface 318 to adjust discrete levels of the perimeter portion. In this example, the user-interface 318 may include a number of discrete levels 320 for the user to select from and a slider to assist the user in selecting a discrete level. As such, the user may increase or decrease the size of the perimeter portion using the slider. As an example, the lowest setting of the discrete level may correspond to the background perimeter 310, and the highest setting of the discrete level may correspond to the foreground perimeter 308.

As an example, adjusting the slider 318 may move both the foreground perimeter 308 and the background perimeter 310. For this example, the slider 318 may have two slides: a first slide 322 to move the background perimeter 310 and a second slide 324 to move the foreground perimeter 308. For the position of the first slide 322 shown in FIG. 3D, the background perimeter 310 is moved to position 316, and for the position of the second slide 324 shown in FIG. 3D, the foreground perimeter 308 is moved to position 314. As such, the perimeter portion is adjusted to be between positions 316 and 314.

As an example, adjusting the slider 318 may move the background perimeter 310 but keep the foreground perimeter 308 constant. For this example, the slider 318 may have only one slide: the first slide 322 to move the background perimeter 310. For the position of the first slide 322 shown in FIG. 3D, the background perimeter 310 is moved to position 316, and the foreground perimeter 308 is not moved. As such, the perimeter portion is adjusted to be between positions 316 and 308.

As an example, adjusting the slider 318 may move the foreground perimeter 308 but keep the background perimeter 310 constant. For this example, the slider 318 may have only one slide: the second slide 324 to move the foreground perimeter 308. For the position of the second slide 324 shown in FIG. 3D, the foreground perimeter 308 is moved to position 314, and the background perimeter 310 is not moved. As such, the perimeter portion is adjusted to be between positions 314 and 310.

FIGS. 4A-4C depict examples of medical images. In these examples, the medical images are MRI images of a subject's head. FIG. 4A shows an MRI image of a subject's head at an axial angle; FIG. 4B shows an MRI image of a subject's head at a sagittal angle; and FIG. 4C shows an MRI image of a subject's head at a coronal angle.

FIGS. 5A-5C depict examples of the medical images shown in FIGS. 4A-4C with histogram adjustment to show the existing background noises.

FIGS. 6A-6C depict examples of the medical images shown in FIGS. 4A-4C filtered according to an exemplary embodiment of the invention. In the examples depicted in FIGS. 6A-6C, the medical images were filtered with a mask that included a perimeter separating voxels deemed to be foreground voxels from voxels deemed to be background voxels. When filtered with the mask, the voxels deemed to be foreground voxels maintained their values, and the voxels deemed to be background voxels were assigned a constant background value (which was "0" here, corresponding to the color black). As such, in these filtered medical images, the foreground voxels are depicted in their maintained grey colors, and the background voxels are depicted as the color black. The masks were generated per step 106 of FIG. 1.

FIGS. 7A-7C depict another example of the medical images shown in FIGS. 4A-4C filtered according to an exemplary embodiment of the invention. Similar to the examples depicted in FIGS. 6A-6C, the medical images were filtered with a mask that included a perimeter separating voxels deemed to be foreground voxels from voxels deemed to be background voxels. When filtered with the mask, the voxels deemed to be foreground voxels maintained their values, except that voxels within the perimeter that had a background color (e.g., "0", for the color black) were assigned a value that was not associated with the background color (e.g., a non-zero value that is not the color black). Voxels deemed to be background voxels were assigned a constant background value (which was "0" here, corresponding to the color black). As such, in these filtered medical images, the foreground voxels are depicted in their maintained grey colors or adjusted so not to be the background color, and the background voxels are depicted as the color black. The masks were generated per step 106 of FIG. 1.

FIGS. 8A-10C depict examples of medical images filtered with different user-adjustable discrete levels used to adjust the size of the perimeter portion of the mask. In these examples, the foreground voxels of a subject's head at different angles are shown in grey colors, and the background voxels are filtered to appear as the color black. In the examples depicted in FIGS. 8A-10C, there are 255 user-adjustable discrete levels. The user-adjustable levels adjust a size of the perimeter portion of the mask. The user-adjustable levels can increase the size of the perimeter portion by decreasing the discrete levels and can decrease the size of the perimeter portion by increasing the discrete levels. In this example, a background perimeter (similar to the background perimeter 308 in FIG. 3D) of the perimeter portion is kept constant, and a foreground perimeter (similar to the foreground perimeter 310 in FIG. 3D) is user-adjustable over 255 discrete levels, where level 255 places the foreground perimeter closest to the background perimeter and level 1 places the foreground perimeter furthest from the background perimeter.

Figures 8A, 8B, 8C, 9A, 9B, 9C, 10A, 10B, 10C:
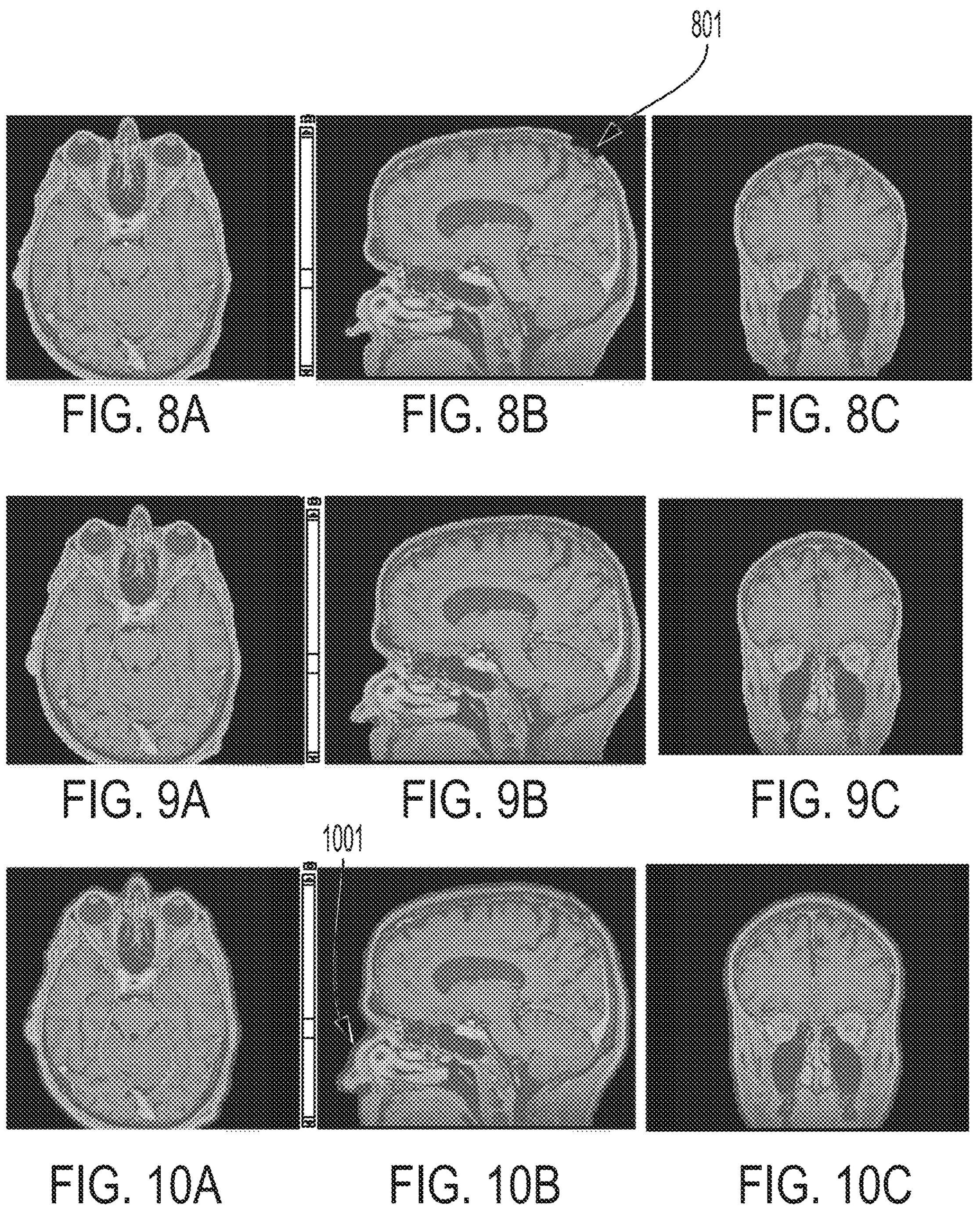
FIGS. 8A-8C depict examples of medical images filtered with a high discrete level.
FIGS. 9A-9C depict examples of medical images filtered with a discrete level near a midpoint of the discrete levels.
FIGS. 10A-10C depict examples of medical images filtered with a low discrete level.

FIGS. 8A-8C depict examples of medical images filtered with a high discrete level. In this example, the generated filtered image has a discrete level of 223. As shown in FIGS. 8A-8C, the size of the foreground voxels (in grey colors) is reduced, and the background voxels (in black color) erode the perimeter of the foreground voxels, such as in portion 801.

FIGS. 9A-9C depict examples of medical images filtered with a discrete level near a midpoint of the discrete levels. In this example, the generated filtered image has a discrete level of 172. As shown in FIGS. 9A-9C, the perimeter of the foreground voxels (in grey colors) is clear, and the background voxels (in block color) are removed with little errors.

FIGS. 10A-10C depict examples of medical images filtered with a low discrete level. In this example, the generated filtered image has a discrete level of 18. As shown in FIGS. 10A-10C, the size of foreground voxels (in grey colors) is increased and thus the perimeter of the foreground voxels includes unwanted background voxels, such as in portion 1001.

Figure 11:
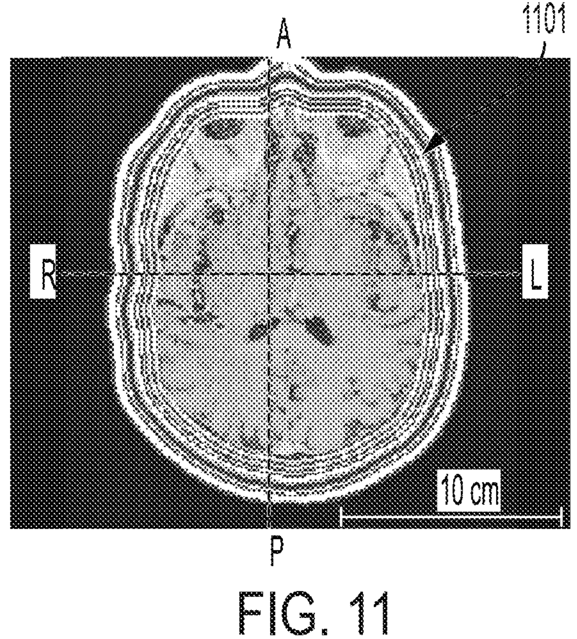
FIG. 11 depicts an example of generated filtered images with a plurality of discrete levels.

FIG. 11 depicts an example of generated filtered image with a plurality of discrete levels. In the example depicted in FIG. 11, the foreground voxels comprise voxels of a subject's head and the perimeter of the subject's head. The perimeter portion is the area of the subject's head from the lowest discrete level to the highest discrete level. The perimeters that are close to the inside of the subject's head have higher discrete levels, and the perimeters that are close to the background voxels have lower discrete levels. The discrete levels 1101 within the perimeter portion are shown in different grey colors.

Figures 12A, 12B, 12C:
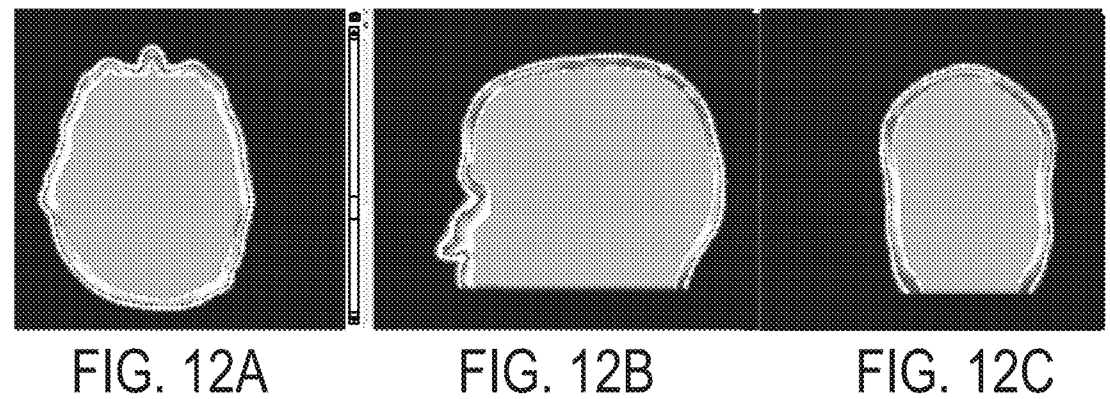
FIGS. 12A-12C depict examples of a visualization of an exemplary mask with different discrete levels.

FIGS. 12A-12C depict examples of a visualization of an exemplary mask with different discrete levels. In the examples depicted in FIGS. 12A-12C, the portion of the mask for voxels that are deemed foreground voxels is depicted in the same grey color, and the portion of the mask for voxels that are deemed background voxels is the background color (which is black color here). As shown in FIGS. 12A-12C, the discrete levels of the perimeter portion of the mask capture varying features of the subject, as indicated by the varying grey color values. As shown in FIGS. 12A-12C, the perimeters that are close to the inside of the subject's head are closer to black color, and as the perimeters get closer to the background voxels, the colors of the perimeters change from dark grey to light grey.

Figures 13A, 13B:
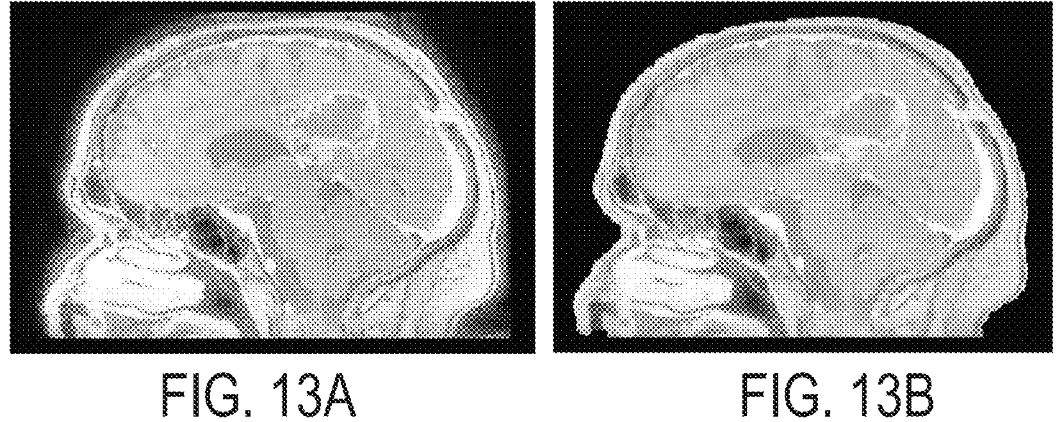
FIG. 13A depicts an example of a medical image.
FIG. 13B depicts an example of the medical image after removing background.

FIG. 13A depicts an example of a medical image, and FIG. 13B depicts an example of the medical image after removing background with a mask according to an exemplary embodiment. In the example, the mask has a discrete level of 126 out of 255 discrete levels. As can be seen, the resulting filtered medical image clearly indicates the perimeter of the subject's head.

Figure 14:
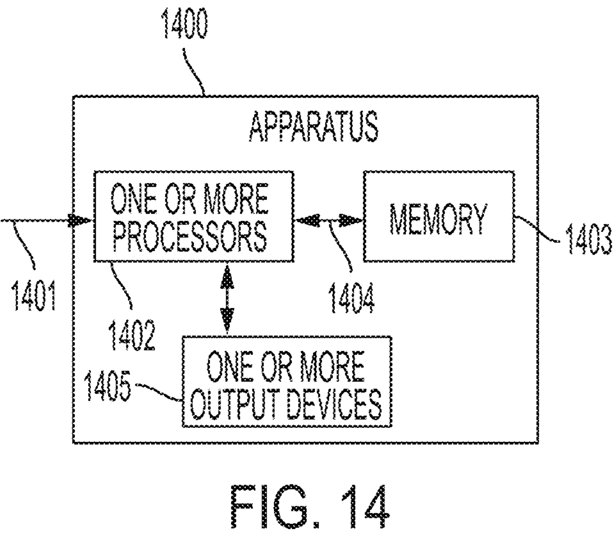
FIG. 14 depicts an example computer apparatus for use with the embodiments herein.

FIG. 14 depicts an example computer apparatus for use with the embodiments herein. As an example, the apparatus 1400 may be a computer to implement certain inventive techniques disclosed herein, such as removing background noise from a medical image. For example, the methods of FIGS. 1 and 2 may be performed by a computer, such as apparatus 1400. The apparatus 1400 may include one or more processors 1402, memory 1403, one or more input devices, and one or more output devices 1405.

In one example, based on input 1401, the one or more processors remove background from an image according to embodiments herein. In one example, the input 1401 is user input. In another example, the input 1401 may be from another computer in communication with the apparatus 1400. The input 1401 may be received in conjunction with one or more input devices (not shown) of the apparatus 1400.

The memory 1403 may be accessible by the one or more processors 1402 (e.g., via a link 1404) so that the one or more processors 1402 can read information from and write information to the memory 1403. The memory 1403 may store instructions that when executed by the one or more processors 1402 implement one or more embodiments described herein. The memory 1403 may be a non-transitory computer readable medium (or a non-transitory processor readable medium) containing a set of instructions thereon for removing background noise from a medical image, wherein when executed by a processor (such as one or more processors 1402), the instructions cause the processor to perform one or more methods disclosed herein The one or more output devices 1405 may provide the status of the computer-implemented techniques herein. The one or more output devices 1405 may provide visualization data according to certain embodiments of the invention, such as the medical image, mask, the filtered image, and/or voxel intensity of the medical image. The one or more output devices 1405 may display the user-adjustable level, which may be controlled using the input 1401.

The apparatus 1400 may be an apparatus for removing background noise from a medical image, the apparatus including: one or more processors (such as one or more processors 1402); and memory (such as memory 1403) accessible by the one or more processors, the memory storing instructions that when executed by the one or more processors, cause the apparatus to perform one or more methods disclosed herein.

ILLUSTRATIVE EMBODIMENTS

The invention includes other illustrative embodiments, such as the following.

Illustrative Embodiment 1. A computer-implemented method to remove background noise from a medical image comprising voxels, each voxel having a voxel intensity, the method comprising: generating a mask based on the medical image, wherein the mask comprises a foreground portion designating foreground voxels, a background portion designating background voxels, and a perimeter separating the foreground portion from the background portion; designating a perimeter portion of the mask, the perimeter portion enclosing the perimeter, a subset of the foreground portion, and a subset of the background portion; designating a threshold for the perimeter portion to separate voxels based on voxel intensity; filtering the medical image with the mask and the threshold to obtain a filtered image; and displaying the filtered image on a display.

Illustrative Embodiment 2. The method of Illustrative Embodiment 1, wherein after filtering the medical image with the mask: voxels in the medical image located in a remainder of the foreground portion of the mask maintain their voxel intensity in the filtered image, voxels in the medical image located in a remainder of the background portion of the mask are assigned a background voxel intensity, voxels in the medical image located in the perimeter portion of the mask maintain their voxel intensity in the filtered image if the voxel intensity is above the threshold, and voxels in the medical image located in the perimeter portion of the mask are assigned the background voxel intensity in the filtered image if the voxel intensity is below the threshold.

Illustrative Embodiment 3. The method of Illustrative Embodiment 1, wherein voxels in the medical image located in the perimeter portion of the mask are assigned a voxel intensity in the filtered image based on the threshold and a location of the voxel in the perimeter portion.

Illustrative Embodiment 4. The method of Illustrative Embodiment 1, wherein for a voxel in the medical image located in the perimeter portion, filtering of the medical image comprises averaging a voxel intensity of the voxel and an intensity assigned to the voxel based on a distance of the voxel from the perimeter portion.

Illustrative Embodiment 5. The method of Illustrative Embodiment 1, wherein for a voxel in the medical image located in the perimeter portion, filtering of the medical image comprises assigning an intensity to the voxel based on a distance relative to a location in the foreground portion.

Illustrative Embodiment 6. The method of Illustrative Embodiment 5, wherein the intensity assigned to the voxel is greater if the distance relative to the location in the foreground portion is smaller.

Illustrative Embodiment 7. The method of Illustrative Embodiment 1, wherein for a voxel in the medical image located in the perimeter portion, filtering of the medical image comprises weighted averaging a voxel intensity of the voxel and an intensity assigned to the voxel based on a distance of the voxel from the perimeter portion.

Illustrative Embodiment 8. The method of Illustrative Embodiment 1, wherein voxels in the medical image located in the perimeter portion of the mask are assigned a voxel intensity in the filtered image based on a weighted combination of a voxel intensity of the voxel in the medical image and another voxel intensity based on a location of the voxel in the perimeter portion.

Illustrative Embodiment 9. The method of Illustrative Embodiment 1, wherein for voxels in the medical image located in the perimeter portion, filtering of the medical image comprises voxel-by-voxel weighted summing of normalized voxel intensities of the voxels and voxel intensities for corresponding locations in the perimeter portion.

Illustrative Embodiment 10. The method of Illustrative Embodiment 8, wherein the perimeter portion comprises a foreground perimeter separating the perimeter portion from a remainder of the foreground portion, wherein the perimeter portion comprises a background perimeter separating the perimeter portion from a remainder of the background portion, wherein the voxel intensities for corresponding locations in the perimeter portion are based on a distance of the locations from the foreground perimeter of the perimeter portion or the background perimeter of the perimeter portion.

Illustrative Embodiment 11. The method of Illustrative Embodiment 1, wherein the method further comprises: scaling the voxel intensities of the voxels in the medical image to obtain a scaled medical image; and assigning scaled voxel intensities to voxels in the perimeter portion of the mask based on a distance of the voxels in the mask from a foreground perimeter separating the perimeter portion from a remainder of the foreground portion or a background perimeter separating the perimeter portion from a remainder of the background portion, wherein filtering the medical image with the mask comprises: filtering the scaled medical image with the mask and the threshold; for voxels in the scaled medical image located in the remainder of the foreground portion of the mask, maintaining voxel intensities of the voxels in the filtered image; for voxels in the scaled medical image located in the remainder of the background portion of the mask, assigning a background voxel intensity to the voxels in the filtered image; for voxels in the scaled medical image located in the perimeter portion of the mask: if the voxel intensity is above the threshold, assigning a voxel intensity to the voxels in the filtered image based on a weighted combination of the scaled voxel intensities of the scaled medical image and the scaled voxel intensities of the voxels in the perimeter portion of the mask; and if the voxel intensity is below the threshold, assigning the background voxel intensity to the voxels in the filtered image.

Illustrative Embodiment 12. The method of Illustrative Embodiment 1, wherein the threshold is a user-defined weighted threshold, wherein filtering the medical image comprises filtering the medical image with the mask and the user-defined weighted threshold to obtain the filtered image.

Illustrative Embodiment 13. The method of Illustrative Embodiment 1, wherein the threshold is a weighted threshold, wherein for a voxel in the medical image located in the perimeter portion having an intensity greater than the weighted threshold, filtering of the medical image comprises assigning an intensity to the voxel based on an intensity of the voxel in the medical image.

Illustrative Embodiment 14. The method of Illustrative Embodiment 1, further comprising pre-processing the medical image prior to generating the mask to obtain a pre-processed medical image, wherein the threshold is a weighted threshold, wherein for a voxel in the medical image located in the perimeter portion having an intensity greater than the weighted threshold, filtering of the medical image comprises assigning an intensity to the voxel based on an intensity of the voxel in the pre-processed medical image.

Illustrative Embodiment 15. The method of Illustrative Embodiment 1, wherein the threshold is a weighted threshold, wherein for a voxel in the medical image located in the perimeter portion having an intensity greater than the weighted threshold, filtering of the medical image comprises assigning an intensity to the voxel based on a weighted average of intensities.

Illustrative Embodiment 16. The method of Illustrative Embodiment 1, wherein the perimeter portion comprises: a foreground perimeter separating the perimeter portion from a remainder of the foreground portion, the remainder of the foreground portion not including the subset of the foreground portion; and the perimeter portion comprises a background perimeter separating the perimeter portion from a remainder of the background portion, the remainder of the background portion not including the subset of the background portion.

Illustrative Embodiment 17. The method of Illustrative Embodiment 16, wherein the perimeter is approximately equidistant from the foreground perimeter and the background perimeter.

Illustrative Embodiment 18. The method of Illustrative Embodiment 16, wherein a width of the perimeter portion between the foreground perimeter and the background perimeter is approximately 10 mm.

Illustrative Embodiment 19. The method of Illustrative Embodiment 1, wherein the perimeter portion of the mask is user-defined, and the threshold for the perimeter portion is user-defined.

Illustrative Embodiment 20. The method of Illustrative Embodiment 1, further comprising providing a user interface with an interactive slider to designate the perimeter portion.

Illustrative Embodiment 21. The method of Illustrative Embodiment 1, wherein the method further comprising: displaying the voxel intensity of the medical image and/or displaying a weighted average voxel intensity of the voxel based on a distance of the voxel from the perimeter portion.

Illustrative Embodiment 22. The method of Illustrative Embodiment 1, wherein after the image is displayed, the method further comprises: receiving user input to adjust filtering parameters to obtain adjusted filtering parameters, wherein the adjusted filtering parameters comprise at least one of an adjusted size of the perimeter portion or an adjusted threshold for the perimeter portion; filtering the medical image with the adjusted filtering parameters to obtain a revised filtered image; and displaying the revised filtered image on the display.

Illustrative Embodiment 23. The method of Illustrative Embodiment 1, wherein after the image is displayed, the method further comprises: adjusting a size of the perimeter portion to obtain a revised mask; filtering the medical image with the revised mask and the threshold to obtain a revised filtered image; and displaying the revised filtered image on the display.

Illustrative Embodiment 24. The method of Illustrative Embodiment 1, wherein after the image is displayed, the method further comprises: adjusting the threshold to obtain a revised threshold; filtering the medical image with the mask and the revised threshold to obtain a revised filtered image; and displaying the revised filtered image on the display.

Illustrative Embodiment 25. The method of Illustrative Embodiment 1, wherein after the image is displayed, the method further comprises: adjusting a size of the perimeter portion to obtain a revised mask; adjusting the threshold to obtain a revised threshold; filtering the medical image with the revised mask and the revised threshold to obtain a revised filtered image; and displaying the revised filtered image on the display.

Illustrative Embodiment 26. The method of Illustrative Embodiment 1, wherein the foreground portion represents desired tissue in the medical image, wherein the background portion represents one or more regions in the medical image without desired tissue.

Illustrative Embodiment 27. The method of Illustrative Embodiment 1, wherein the foreground portion represents a region of interest in the medical image, wherein the background portion represent one or more regions in the medical image not in the region of interest.

Illustrative Embodiment 28. The method of Illustrative Embodiment 1, wherein the mask is generated through at least one of a multi Otsu thresholding operation, a k-means clustering operation, or a morphological segmentation operation.

Illustrative Embodiment 29. The method of Illustrative Embodiment 1, further comprising: performing a post-processing procedure on the filtered image, wherein the post-processing procedure comprises at least one of a morphologic closing operation, a three-dimensional (3D) fill-hole operation, or a smoothing operation.

Illustrative Embodiment 30. The method of Illustrative Embodiment 1, further comprising: prior to generating the mask, performing a pre-processing procedure on the medical image, wherein the pre-processing procedure comprises at least one of Gaussian smoothing or bias correction.

Illustrative Embodiment 31. The method of Illustrative Embodiment 1, wherein the medical image comprises at least one of a magnetic resonance imaging image, an ultrasound image, a computed tomography image, or an X-ray image.

Illustrative Embodiment 32. The method of Illustrative Embodiment 1, further comprising: generating and outputting, based on the filtered image, one or more recommendations of locations on the subject's body to place one or more transducers for applying tumor treating fields to the subject's body.

Illustrative Embodiment 33. A computer-implemented method to process a medical image, the computer comprising one or more processors and memory accessible by the one or more processors, the memory storing instructions that when executed by the one or more processors cause the computer to perform the method, the method comprising: generating a mask based on the medical image, wherein the mask comprises a foreground portion designating foreground voxels, a background portion designating background voxels, and a perimeter separating the foreground portion from the background portion; designating a perimeter portion of the mask, the perimeter portion enclosing the perimeter, a subset of the foreground portion, and a subset of the background portion; designating a threshold for the perimeter portion to separate voxels based on voxel intensity; filtering the medical image with the mask and the threshold to obtain a filtered image; receiving user input to adjust filtering parameters to obtain adjusted filtering parameters, wherein the adjusted filtering parameters comprise at least one of an adjusted size of the perimeter portion or an adjusted threshold for the perimeter portion; filtering the medical image with the adjusted filtering parameters to obtain a revised filtered image; and displaying the revised filtered image on the display.

Illustrative Embodiment 34. An apparatus for removing background noise from a medical image, comprising one or more processors; and memory storing processor-executable instructions that, when executed by the one or more processors, cause the apparatus to: generate a mask based on the medical image, wherein the mask comprises a foreground portion designating foreground voxels, a background portion designating background voxels, and a perimeter separating the foreground portion from the background portion; designate a perimeter portion of the mask, the perimeter portion enclosing the perimeter, a subset of the foreground portion, and a subset of the background portion, wherein the perimeter portion of the mask is user-defined; designate a threshold for the perimeter portion to separate voxels based on voxel intensity, wherein the threshold for the perimeter portion is user-defined; filter the medical image with the mask and the threshold to obtain a filtered image; and display the filtered image on a display.

Illustrative Embodiment 35. The apparatus of Illustrative Embodiment 34, the apparatus comprises a user interface with an interactive slider that defines the perimeter portion.

Embodiments illustrated under any heading or in any portion of the disclosure may be combined with embodiments illustrated under the same or any other heading or other portion of the disclosure unless otherwise indicated herein or otherwise clearly contradicted by context.

Numerous modifications, alterations, and changes to the described embodiments are possible without departing from the scope of the present invention defined in the claims. It is intended that the present invention not be limited to the described embodiments, but that it has the full scope defined by the language of the following claims, and equivalents thereof.

What is claimed is:

1. A computer-implemented method to remove background noise from a medical image comprising voxels, each voxel having a voxel intensity, the method comprising:

generating a mask based on the medical image, wherein the mask comprises a foreground portion designating foreground voxels, a background portion designating background voxels, and a perimeter separating the foreground portion from the background portion;

designating a perimeter portion of the mask, the perimeter portion enclosing the perimeter, a subset of the foreground portion, and a subset of the background portion;

designating a threshold for the perimeter portion to separate voxels based on voxel intensity;

filtering the medical image with the mask and the threshold to obtain a filtered image; and displaying the filtered image on a display.

2. The method of claim 1, wherein after filtering the medical image with the mask:

voxels in the medical image located in a remainder of the foreground portion of the mask maintain their voxel intensity in the filtered image, voxels in the medical image located in a remainder of the background portion of the mask are assigned a background voxel intensity, voxels in the medical image located in the perimeter portion of the mask maintain their voxel intensity in the filtered image if the voxel intensity is above the threshold, and voxels in the medical image located in the perimeter portion of the mask are assigned the background voxel intensity in the filtered image if the voxel intensity is below the threshold.

3. The method of claim 1, wherein voxels in the medical image located in the perimeter portion of the mask are assigned a voxel intensity in the filtered image based on the threshold and a location of the voxel in the perimeter portion.

4. The method of claim 1, wherein for a voxel in the medical image located in the perimeter portion, filtering of the medical image comprises averaging a voxel intensity of the voxel and an intensity assigned to the voxel based on a distance of the voxel from the perimeter portion.

5. The method of claim 1, wherein for a voxel in the medical image located in the perimeter portion, filtering of the medical image comprises assigning an intensity to the voxel based on a distance relative to a location in the foreground portion.

6. The method of claim 1, wherein voxels in the medical image located in the perimeter portion of the mask are assigned a voxel intensity in the filtered image based on a weighted combination of a voxel intensity of the voxel in the medical image and another voxel intensity based on a location of the voxel in the perimeter portion.

7. The method of claim 1, wherein the perimeter portion comprises a foreground perimeter separating the perimeter portion from a remainder of the foreground portion, wherein the perimeter portion comprises a background perimeter separating the perimeter portion from a remainder of the background portion, wherein the voxel intensities for corresponding locations in the perimeter portion are based on a distance of the locations from the foreground perimeter of the perimeter portion or the background perimeter of the perimeter portion.

8. The method of claim 1, wherein the method further comprises:

scaling the voxel intensities of the voxels in the medical image to obtain a scaled medical image; and assigning scaled voxel intensities to voxels in the perimeter portion of the mask based on a distance of the voxels in the mask from a foreground perimeter separating the perimeter portion from a remainder of the foreground portion or a background perimeter separating the perimeter portion from a remainder of the background portion, wherein filtering the medical image with the mask comprises:

filtering the scaled medical image with the mask and the threshold;

for voxels in the scaled medical image located in the remainder of the foreground portion of the mask, maintaining voxel intensities of the voxels in the filtered image;

for voxels in the scaled medical image located in the remainder of the background portion of the mask, assigning a background voxel intensity to the voxels in the filtered image;

for voxels in the scaled medical image located in the perimeter portion of the mask:

if the voxel intensity is above the threshold, assigning a voxel intensity to the voxels in the filtered image based on a weighted combination of the scaled voxel intensities of the scaled medical image and the scaled voxel intensities of the voxels in the perimeter portion of the mask; and if the voxel intensity is below the threshold, assigning the background voxel intensity to the voxels in the filtered image.

9. The method of claim 1, wherein the threshold is a user-defined weighted threshold, wherein filtering the medical image comprises filtering the medical image with the mask and the user-defined weighted threshold to obtain the filtered image.

10. The method of claim 1, wherein the threshold is a weighted threshold, wherein for a voxel in the medical image located in the perimeter portion having an intensity greater than the weighted threshold, filtering of the medical image comprises assigning an intensity to the voxel based on an intensity of the voxel in the medical image.

11. The method of claim 1, wherein the perimeter portion comprises:

a foreground perimeter separating the perimeter portion from a remainder of the foreground portion, the remainder of the foreground portion not including the subset of the foreground portion; and the perimeter portion comprises a background perimeter separating the perimeter portion from a remainder of the background portion, the remainder of the background portion not including the subset of the background portion.

12. The method of claim 1, wherein the perimeter portion of the mask is user-defined, and the threshold for the perimeter portion is user-defined.

13. The method of claim 1, wherein after the image is displayed, the method further comprises:

receiving user input to adjust filtering parameters to obtain adjusted filtering parameters, wherein the adjusted filtering parameters comprise at least one of an adjusted size of the perimeter portion or an adjusted threshold for the perimeter portion;

filtering the medical image with the adjusted filtering parameters to obtain a revised filtered image; and displaying the revised filtered image on the display.

14. The method of claim 1, wherein the foreground portion represents desired tissue in the medical image, wherein the background portion represents one or more regions in the medical image without desired tissue.

15. The method of claim 1, wherein the mask is generated through at least one of a multi Otsu thresholding operation, a k-means clustering operation, or a morphological segmentation operation.

16. The method of claim 1, further comprising:

performing a post-processing procedure on the filtered image, wherein the post-processing procedure comprises at least one of a morphologic closing operation, a three-dimensional (3D) fill-hole operation, or a smoothing operation.

17. The method of claim 1, further comprising:

generating and outputting, based on the filtered image, one or more recommendations of locations on the subject's body to place one or more transducers for applying tumor treating fields to the subject's body.

18. A computer-implemented method to process a medical image, the computer comprising one or more processors and memory accessible by the one or more processors, the memory storing instructions that when executed by the one or more processors cause the computer to perform the method, the method comprising:

generating a mask based on the medical image, wherein the mask comprises a foreground portion designating foreground voxels, a background portion designating background voxels, and a perimeter separating the foreground portion from the background portion;

designating a perimeter portion of the mask, the perimeter portion enclosing the perimeter, a subset of the foreground portion, and a subset of the background portion;

designating a threshold for the perimeter portion to separate voxels based on voxel intensity;

filtering the medical image with the mask and the threshold to obtain a filtered image;

receiving user input to adjust filtering parameters to obtain adjusted filtering parameters, wherein the adjusted filtering parameters comprise at least one of an adjusted size of the perimeter portion or an adjusted threshold for the perimeter portion;

filtering the medical image with the adjusted filtering parameters to obtain a revised filtered image; and displaying the revised filtered image on the display.

19. An apparatus for removing background noise from a medical image, comprising one or more processors; and memory storing processor-executable instructions that, when executed by the one or more processors, cause the apparatus to:

generate a mask based on the medical image, wherein the mask comprises a foreground portion designating foreground voxels, a background portion designating background voxels, and a perimeter separating the foreground portion from the background portion;

designate a perimeter portion of the mask, the perimeter portion enclosing the perimeter, a subset of the foreground portion, and a subset of the background portion, wherein the perimeter portion of the mask is user-defined;

designate a threshold for the perimeter portion to separate voxels based on voxel intensity, wherein the threshold for the perimeter portion is user-defined;

filter the medical image with the mask and the threshold to obtain a filtered image; and display the filtered image on a display.

20. The apparatus of claim 19, wherein the apparatus comprises a user interface with an interactive slider that defines the perimeter portion.

* * * * *